United States Patent
Smith et al.

(10) Patent No.: US 9,689,412 B1
(45) Date of Patent: Jun. 27, 2017

(54) METHOD AND APPARATUS FOR MAGNETIC PANEL ATTACHMENT

(71) Applicant: NORTHROP GRUMMAN SYSTEMS CORPORATION, Falls Church, VA (US)

(72) Inventors: Charles R. Smith, Acton, CA (US);
Cory M. Combs, Temecula, CA (US);
John C. Rufino, Bakersfield, CA (US);
Matthew A. Neal, Lancaster, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 15/421,962

(22) Filed: Feb. 1, 2017

(51) Int. Cl.
*F16B 5/06* (2006.01)
*B64C 1/12* (2006.01)
*H01F 7/04* (2006.01)

(52) U.S. Cl.
CPC ............... *F16B 5/065* (2013.01); *B64C 1/12* (2013.01); *H01F 7/04* (2013.01)

(58) Field of Classification Search
USPC ..... 244/129.4, 129.5, 131, 123.11; 49/478.1, 49/477.1
See application file for complete search history.

(56) References Cited

U.S. PATENT DOCUMENTS

| | | | | |
|---|---|---|---|---|
| 6,059,230 A * | 5/2000 | Leggett | ............... | B64C 1/1461 |
| | | | | 244/129.4 |
| 7,329,164 B2 * | 2/2008 | Bermal | ............... | B64C 1/1415 |
| | | | | 292/144 |
| 7,823,835 B2 * | 11/2010 | Barker | ............... | B64C 1/1415 |
| | | | | 244/107 |
| 8,493,715 B1 * | 7/2013 | Angelucci | ............... | B64D 45/00 |
| | | | | 244/1 R |
| 9,296,467 B1 * | 3/2016 | Hollibaugh | ............... | B64C 3/34 |
| 9,458,648 B1 * | 10/2016 | Neal | ............... | E05B 51/02 |
| 9,517,830 B2 * | 12/2016 | Hariram | ............... | B64C 1/1407 |
| 2004/0094670 A1 * | 5/2004 | Pratt | ............... | B64C 1/1469 |
| | | | | 244/129.4 |
| 2009/0014590 A1 * | 1/2009 | Ponsart | ............... | B64C 1/1446 |
| | | | | 244/129.4 |
| 2015/0082708 A1 * | 3/2015 | Eilken | ............... | B64C 1/1407 |
| | | | | 49/477.1 |
| 2015/0329194 A1 * | 11/2015 | Joern | ............... | B64C 1/1423 |
| | | | | 244/129.5 |

(Continued)

*Primary Examiner* — Christopher P Ellis
(74) *Attorney, Agent, or Firm* — John A. Miller; Miller IP Group, PLC

(57) ABSTRACT

A magnetic fastener assembly for securing an access panel to an aircraft structure. A panel magnetic foundation member is rigidly secured to a surface of the panel facing the aircraft structure and a land magnetic foundation member is rigidly secured to a surface of the aircraft structure facing the panel. A planar magnet is positioned between the panel magnetic foundation member and the land magnetic foundation member and being magnetically coupled thereto so as to secure the panel to the aircraft structure. A separation device, such as a pneumatic bladder, is positioned between the panel and the land structure and adjacent to the magnet, and is rigidly secured to the aircraft structure. The separation device is actuated to apply pressure to the panel and break the magnetic attraction between one or both of the panel magnetic foundation member and the magnet or the land magnetic foundation member and the magnet.

20 Claims, 2 Drawing Sheets

(56) References Cited

U.S. PATENT DOCUMENTS

2016/0195378 A1* 7/2016 Medina .................. B64G 1/641
                                                           244/131
2016/0236764 A1* 8/2016 Combs ...................... B64C 1/14

* cited by examiner

METHOD AND APPARATUS FOR MAGNETIC PANEL ATTACHMENT

BACKGROUND

Field

This invention relates generally to a magnetic fastener assembly and, more particularly, to a magnetic fastener assembly for securing an access panel to an aircraft structure, where the magnetic fastener assembly can be released by a pneumatic device.

Discussion

Various aircraft, both military and commercial, typically employ a number of access panels provided in the outer mold line (OML) of the aircraft fuselage that allows access to various structures, components, devices, etc. within the aircraft for maintenance purposes and otherwise. These types of access panels are typically secured to the aircraft fuselage by a number of suitable fastening devices that are both robust and reliable, and that do not interfere with aerodynamic surfaces of the aircraft. Such fasteners are available in a variety of styles and shapes, but are typically some type of screw fastener that is counter-sunk within the access panel and is threaded into a threaded opening in the aircraft structure. Other types of fasteners are known in the art that may hold such panels from underneath, which reduces or eliminates any type of protrusion through the OML of the aircraft.

For a typical fastener of this type, it may take up to a full minute for a worker to remove each fastener, and may take up to a minute and a half for the worker to replace the fastener once the maintenance operation is complete and the panel is reattached to the aircraft structure. Depending on the size of the panel and the type of aircraft, many fasteners may be required to secure the panel to the aircraft structure. Thus, because it takes a significant time to remove the panel and reattach the panel, the aircraft could be out of service for an unacceptable period of time. Therefore, it is desirable to reduce the time that it takes a worker to remove the fasteners from the access panel to remove the panel and gain access to the particular components housed therein. Further, during normal removal of the access panel and reattachment of the access panel, a small percentage of the fasteners are often times damaged, where they have to be replaced, which also adds expense and time to the process.

For those aircraft that employ a latching mechanism to secure an access panel to the aircraft structure, it often times is necessary to provide additional structural support members in the latching mechanism and/or the aircraft structure so as to reduce the chance of latch failure, which adds undesirable weight to the aircraft.

SUMMARY

The present invention discloses and describes a magnetic fastener assembly for securing an access panel to an aircraft structure. The fastener assembly includes a panel magnetic foundation member rigidly secured to a surface of the panel facing the aircraft structure and a land magnetic foundation member rigidly secured to a surface of the aircraft structure facing the panel. The fastener assembly also includes a planar magnet positioned between the panel magnetic foundation member and the land magnetic foundation member and being magnetically coupled thereto so as to secure the panel to the aircraft structure. A separation device, such as a pneumatic bladder, is positioned between the panel and the land structure and adjacent to the magnet, and is rigidly secured to the aircraft structure. The separation device is actuated to apply pressure to the panel and break the magnetic attraction between one or both of the panel magnetic foundation member and the magnet or the land magnetic foundation member and the magnet.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a magnetic fastener for fastening an access panel to an aircraft structure is merely exemplary in nature, and is in no way intended to limit the invention or its applications or uses. For example, as discussed herein, the magnetic fastener of the invention has particular application for securing an access panel on an outer mold line of an aircraft. However, the magnetic fastener may have other applications.

Figure 1:
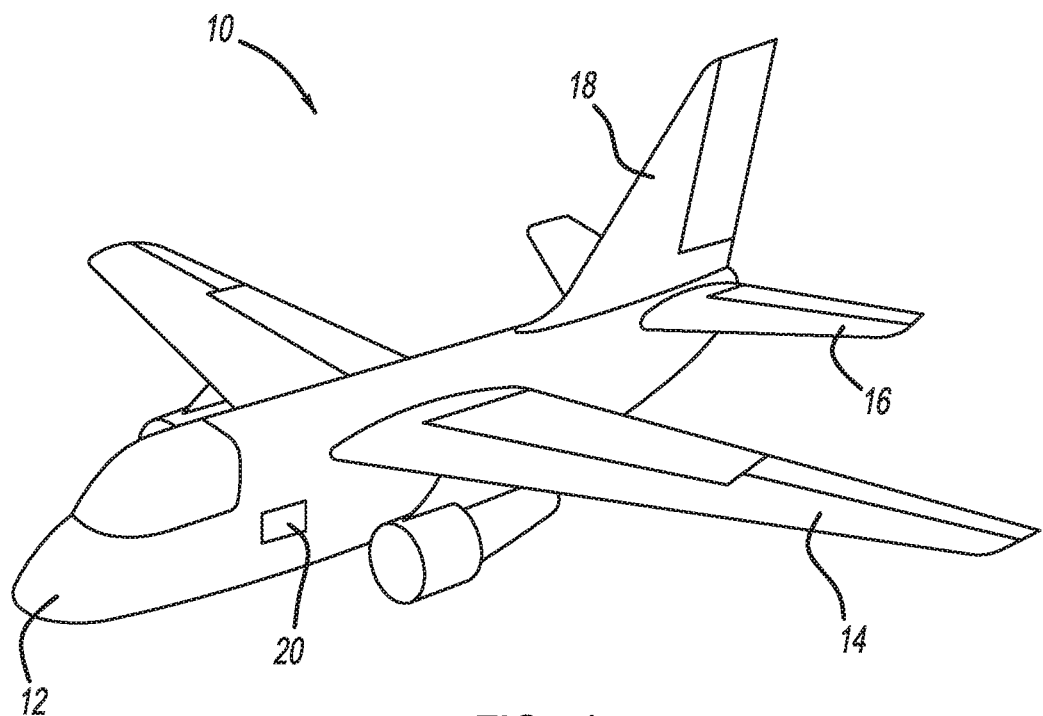
FIG. 1 is an isometric view of an aircraft including an access panel.

FIG. 1 is an isometric view of an aircraft 10 including a fuselage 12, wings 14, horizontal stabilizers 16 and a vertical stabilizer or tail 18. The aircraft 10 is intended to be a general representation of any fixed wing aircraft including both military and commercial aircraft. The aircraft 10 also includes an access panel 20 formed in an outer mold line (OML) of the fuselage 12, and is intended to represent any panel secured to the structure of the aircraft 10 at any location and having any size. As will be discussed below, the present invention proposes a magnetic fastener assembly for securing the panel 20 the fuselage 12 in a robust and reliable manner, where the access panel 20 can be readily removed from the fuselage 12, and which does not interfere with the aerodynamic properties of the aircraft 10.

Figure 2:
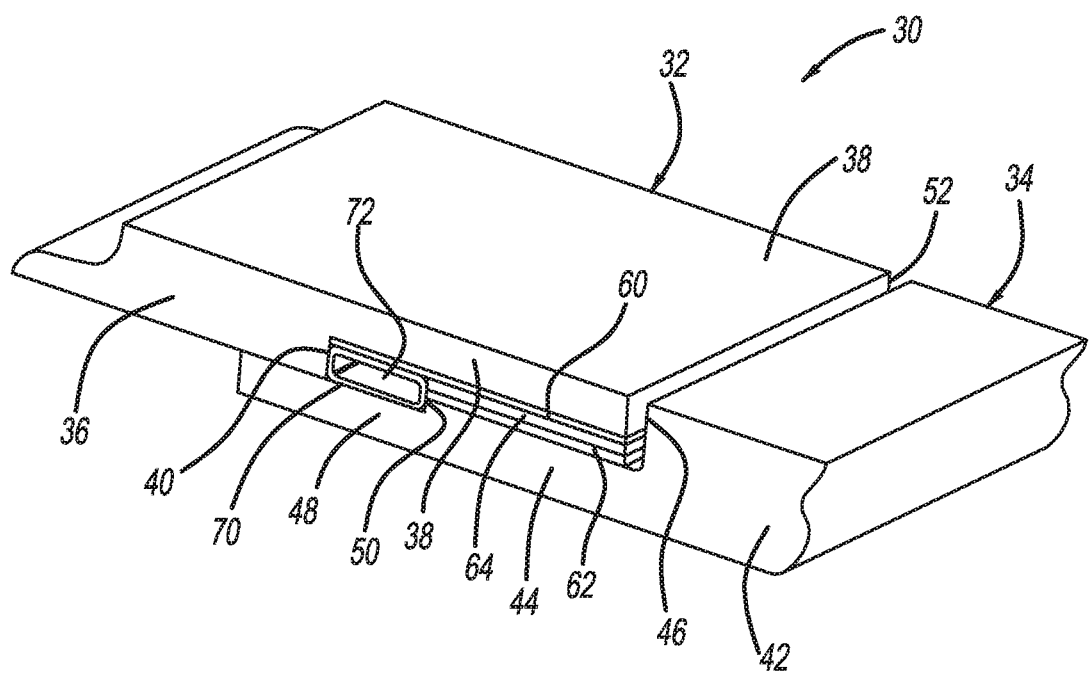
FIG. 2 is a cut-away isometric view of a magnetic fastener assembly for fastening a panel to a land.

FIG. 2 is a cut-away isometric view of a magnetic fastener assembly 30 for securing an access panel 32 intended to represent, for example, the panel 20, to a land 34 intended to represent, for example, the fuselage 12. The panel 32 includes a body portion 36 and an edge portion 38 defining a shoulder 40 therebetween. Likewise, the land 34 includes a body portion 42, a transition portion 44 defining a shoulder 46 between the portions 42 and 44, and an edge portion 48 defining a shoulder 50 between the portions 44 and 48, where a gap 52 is defined between the shoulder 46 and an end of the edge portion 38.

The assembly 30 also includes a planar ferromagnetic panel foundation member 60 rigidly and permanently secured or bonded to the underside of the edge portion 38 of the panel 32 so that it faces the portions 44 and 48 of the land 34, where the member 60 extends the length of the edge portion 38 and abuts against the shoulder 40, as shown. Likewise, the assembly 30 includes a planar ferromagnetic land foundation member 62 permanently bonded to the transition portion 44 of the land 34 so that it aligns with the shoulder 50. A planar magnet 64 is positioned between the members 60 and 62 so that both of the members 60 and 62 are magnetically coupled to the magnet 64, which secures the panel 32 to the land 34. The member 60 can be secured to the panel 32 and the member 62 can be secured to the land 34 in any suitable manner, such as by an adhesive, rivets, bolts, etc. The ferromagnetic material of the members 60 and 62 can be any suitable ferromagnetic material, such as steel, that exhibits magnetic properties when in the presence of a magnetic field.

The magnet 64 can be any magnetic material suitable for the purposes discussed herein. Neodymium is one good magnetic material, however, it is not corrosion resistant. For this example, the magnet 64 can be coated with a desirable corrosion resistant material, such as nickel platting or a polymer coating. Nickel provides a number of advantages including it is a magnetic material and thus tends not to mitigate the strength of the magnet 64 and is galvanically compatible with composites. Further, nickel is electrically conductive and thus helps maintain a proper "sheet" current flow on or near the panel 32 in response to lightning strikes, which helps prevent arcing that could otherwise damage the panel 32 or structures around the panel 32. By providing a good conductive path around the periphery of the panel 32 it is possible to ground the panel 32 and mitigate the risk of arcing. Polymer coatings would be less expensive that conductive coatings, however they need to withstand the long term exposure of the aircraft, and further are not electrically conductive or magnetic.

Figure 3:
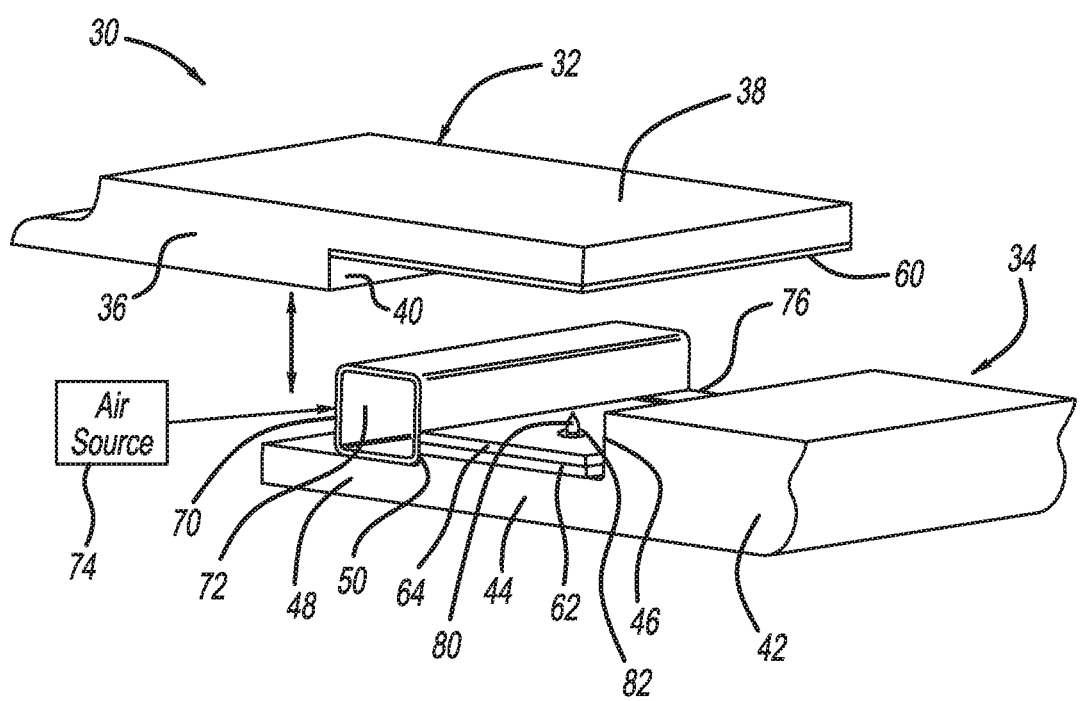
FIG. 3 is an exploded view of the magnetic fastener assembly showing the panel separated from the land.

A pneumatic bladder 70 including an internal chamber 72 is rigidly secured to the edge portion 48 and is positioned against the foundation member 60 and abuts against the foundation member 62 and the magnet 64, as shown. The pneumatic bladder 70 can be made of any suitable flexible material and can be secured to the land 34 in any suitable manner, such as by an adhesive. The bladder 70 is inflated by providing air from an air source 74 to the chamber 72 to apply pressure to the panel 32 and separate the panel 32 from the land 34, as shown in FIG. 3. The air source 74 can be any source for the particular application, and can be on the aircraft 10 or can be brought to the aircraft 10 and connected to the pneumatic bladder 70 by coupling a hose thereto. When the bladder 70 is inflated, the pressure causes the magnetic attraction between the magnet 64 and one or both of the foundation members 60 and 62 to be broken. In an alternate embodiment, the pneumatic bladder 70 can be replaced with pistons that when activated by air or other means push up on the panel 32 in the same manner to break the magnetic attraction.

In one embodiment, the foundation member 62 is thicker than the foundation member 60 so that the magnet 64 is more strongly attached to the foundation member 62 to allow the panel 32 to be separated therefrom the magnet 64, as shown in FIG. 3. Some other mechanism can be employed to remove the magnet 64 from the member 62 if, for example, the magnet 64 needs to be replaced. In one embodiment, the foundation members 60 and 62 can be in the range of 0.030"-0.060" thick, where the land magnetic foundation member 62 may be twice as thick as the panel foundation member 60. In one embodiment, the magnet 64 extends around the complete circumference of the panel 32, and is provided as a number of magnetic sections, such as sections 76, being, for example, one inch long. A worker may apply suction cups (not shown) to the panel 32 to remove it once the bladder 70 is inflated to lift the panel 32 from the land 34. When it is time to reattach the panel 32 to the land 34, the panel 32 can be laid on the inflated bladder 70 and the bladder 70 can be slowly deflated for alignment purposes.

For the application being discussed herein, the panel 32 would be under a significant sheer load when the aircraft 10 is in flight. Such a sheer load may have a tendency to cause the magnetic attraction between the foundation member 60 or 62 and the magnet 64 to slip or move laterally. Thus, the present invention proposes providing a series of alignment studs 80 that are mounted to the land 34 and extend up through an opening 82 in the magnet 64. When the panel 32 is secured to the land 34 the alignment studs 80 will be positioned within an alignment opening (not shown) in an underside of the edge portion 38 of the panel 32 so as to help overcome the sheer force thereon. In an alternate embodiment, the roughened surfaces can be employed to provide high friction shear forces. Also, shaped locking features can be provided between the panel 32 and the land 34 to overcome the shear forces.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fastener assembly for securing a panel to a land structure, said panel including an outer edge portion and said land structure including a shoulder where the edge portion is positioned against the shoulder when the panel is secured to the land structure that defines a gap between the edge portion of the panel and the land structure, said fastener assembly comprising:

a panel magnetic foundation member rigidly secured to a surface of the panel facing the land structure;

a land magnetic foundation member rigidly secured to a surface of the land structure facing the panel;

at least one planar magnet positioned between the panel magnetic foundation member and the land magnetic foundation member and being magnetically coupled thereto so as to secure the panel to the land structure; and a separation device positioned between the panel and the land structure and adjacent to the magnet so that it is completely inboard from the gap and not exposed to an outer mold line of the land structure, said separation device being rigidly secured to the land structure, said separation device being actuated to apply pressure to the panel and break the magnetic attraction between one or both of the panel magnetic foundation member and the magnet or the land magnetic foundation member and the magnet.

2. The fastener assembly according to claim 1 wherein the separation device is a pneumatic device.

3. The fastener assembly according to claim 2 wherein the pneumatic device is a pneumatic bladder.

4. The fastener assembly according to claim 2 wherein the pneumatic device is at least one piston.

5. The fastener assembly according to claim 1 wherein the magnetic attraction between the magnet and the panel magnetic foundation member is less than the magnetic attraction between the magnet and the land magnetic foundation layer so that the separation device breaks the magnetic attraction between the panel magnetic foundation member and the magnet before the magnetic attraction between the land magnetic foundation member and the magnet.

6. The fastener assembly according to claim 1 wherein the land magnetic foundation member has a thickness greater than the panel magnetic foundation member.

7. The fastener assembly according to claim 1 wherein the at least one magnet is a plurality of magnets positioned side-by-side.

8. The fastener assembly according to claim 1 further comprising at least one alignment stud rigidly secured to the land structure and being positioned within an opening in the panel and between the separation device and the shoulder.

9. The fastener assembly according to claim 1 wherein the panel is an access panel on an aircraft and the land structure is an outer mold line (OML) structure of the aircraft.

10. The fastener assembly according to claim 1 wherein the separation device is in contact with the panel magnetic foundation member.

11. The fastener assembly according to claim 1 wherein the panel magnetic foundation member and the land magnetic foundation member are planar members.

12. The fastener assembly according to claim 1 wherein the panel magnetic foundation member and the land magnetic foundation member are ferromagnetic members.

13. The fastener assembly according to claim 1 wherein the at least one magnet is a neodymium magnet.

14. The fastener assembly according to claim 1 wherein the at least one magnet is coated with an electrically conductive and magnetic coating or a polymer coating.

15. A fastener assembly for securing an access panel to an aircraft structure, said panel including an outer edge portion and said aircraft structure including a shoulder where the edge portion is positioned against the shoulder when the panel is secured to the aircraft structure that defines a gap between the edge portion of the panel and the aircraft structure, said fastener assembly comprising:
   a panel ferromagnetic foundation member rigidly secured to a surface of the panel facing the aircraft structure;
   an aircraft ferromagnetic foundation member rigidly secured to a surface of the aircraft structure facing the panel;
   at least one planar magnet positioned between the panel magnetic foundation member and the aircraft magnetic foundation member and being magnetically coupled thereto so as to secure the panel to the aircraft structure; and
   a pneumatic bladder positioned between the panel and the aircraft structure and adjacent to the magnet so that it is completely inboard from the gap and not exposed to an outer mold line of the aircraft structure, said pneumatic bladder being rigidly secured to the aircraft structure, wherein the magnetic attraction between the magnet and the panel magnetic foundation member is less than the magnetic attraction between the magnet and the aircraft magnetic foundation layer, said pneumatic bladder being inflated to apply pressure to the panel and break the magnetic attraction between the panel magnetic foundation member and the magnet.

16. The fastener assembly according to claim 15 wherein the land magnetic foundation member has a thickness greater than the panel magnetic foundation member.

17. The fastener assembly according to claim 15 wherein the at least one magnet is a plurality of magnets positioned side-by-side.

18. The fastener assembly according to claim 15 further comprising at least one alignment stud rigidly secured to the land structure and being positioned within an opening in the panel and between the separation device and the shoulder.

19. The fastener assembly according to claim 15 wherein the pneumatic bladder is in contact with the panel magnetic foundation member.

20. A fastener assembly for securing an access panel to an aircraft structure, said panel including an outer edge portion and said aircraft structure including a shoulder where the edge portion is positioned against the shoulder when the panel is secured to the aircraft structure that defines a gap between the edge portion of the panel and the aircraft structure, said fastener assembly comprising:
   a panel ferromagnetic foundation member rigidly secured to a surface of the panel facing the aircraft structure;
   an aircraft ferromagnetic foundation member rigidly secured to a surface of the aircraft structure facing the panel, said aircraft ferromagnetic foundation member being thicker than the panel ferromagnetic foundation member;
   at least one planar magnet positioned between the panel magnetic foundation member and the aircraft magnetic foundation member and being magnetically coupled thereto so as to secure the panel to the aircraft structure; and
   a separation device positioned between the panel and the land structure and adjacent to the magnet so that it is completely inboard from the gap and not exposed to an outer mold line of the aircraft structure, said separation device being rigidly secured to the land structure, said separation device being actuated to apply pressure to the panel and break the magnetic attraction between the panel magnetic foundation member and the magnet.

\* \* \* \* \*